(12) United States Patent
Wei et al.

(10) Patent No.: US 12,040,717 B2
(45) Date of Patent: Jul. 16, 2024

(54) ELECTRICAL POWER CONVERSION DEVICE, FUNCTION TRIGGERING CIRCUIT FOR THE SAME, AND FUNCTION TRIGGERING METHOD FOR THE SAME

(71) Applicant: FSP TECHNOLOGY INC., Taoyuan (TW)

(72) Inventors: Lung-Chi Wei, Taoyuan (TW); Ching-Hung Kuo, Taoyuan (TW); Cheng-Han Tsai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 278 days.

(21) Appl. No.: 17/704,293

(22) Filed: Mar. 25, 2022

(65) Prior Publication Data
US 2022/0329162 A1  Oct. 13, 2022

(30) Foreign Application Priority Data

Apr. 7, 2021  (TW) .................................. 110112616

(51) Int. Cl.
*H02M 3/335* (2006.01)
*H02M 1/00* (2006.01)
*H02M 1/32* (2007.01)

(52) U.S. Cl.
CPC ..... *H02M 3/33507* (2013.01); *H02M 1/0009* (2021.05); *H02M 1/32* (2013.01)

(58) Field of Classification Search
CPC ...... H02M 1/0009; H02M 1/32; H02M 1/325; H02M 3/335; H02M 3/33507; H02M 3/33523
See application file for complete search history.

(56) References Cited

U.S. PATENT DOCUMENTS

| 2009/0141525 A1* | 6/2009 | Tsuji | H02M 7/538 363/131 |
| 2020/0112264 A1* | 4/2020 | Arima | H02M 3/33592 |

* cited by examiner

*Primary Examiner* — Gary L Laxton
(74) *Attorney, Agent, or Firm* — WPAT, P.C (57) ABSTRACT

An electrical power conversion device, a function triggering circuit for the electrical power conversion device, and a function triggering method for the electrical power conversion device are provided. The function triggering circuit is coupled between the secondary side of the transformer and the control module and includes a current detection circuit, a delay circuit and a switching circuit. The current detection circuit senses the secondary side of the transformer to generate a detection signal of delay. Before steady-state duty of the transformer, the delay circuit causes an initial level to be higher than an internal level. After steady-state duty of the transformer, the switching circuit selectively generates a function triggering signal according to the detection signal. The function triggering signal is for triggering the control module to carry out an overcurrent protection operation. Therefore, the electrical power conversion device effectuates electrical power conversion precisely and steadily, provides precise overcurrent protection, and achieves low stand-by power consumption.

18 Claims, 4 Drawing Sheets

ELECTRICAL POWER CONVERSION DEVICE, FUNCTION TRIGGERING CIRCUIT FOR THE SAME, AND FUNCTION TRIGGERING METHOD FOR THE SAME

BACKGROUND OF THE INVENTION

Field of the Invention

The present disclosure relates to a function triggering circuit and, more particularly, to an electrical power conversion device, a function triggering circuit for the electrical power conversion device, and a function triggering method for the electrical power conversion device.

Description of the Prior Art

Electrical power conversion devices supply electrical power to electronic products. Nowadays safety standards are becoming stricter. Therefore, the electrical power conversion devices must be designed to comply with safety standards (for example, IEC 60950) of electronic products.

For instance, IEC 60950 requires electronic products to have fireproof casings. When electronic products use electrical power conversion devices whose electrical power specifications are associated with limited power source (LPS), their fireproof capability standard becomes less strict. The electrical power specifications associated with limited power source (LPS) place an upper limitation on voltage, current and energy, limiting the scale of disasters which might be caused by electronic product failures. In view of this, the safety standard of the fireproofing of the casings of electronic products can be lowered, if the electronic products comply with the other requirements of IEC 60950 (for example, use circuit boards which meet flammability standard of above V-1) and use electrical power conversion devices associated with limited power source (LPS). As such, the electronic products have low fireproofing requirements, incur low casing cost, and can be made of environmentally friendly materials.

Given the limited power source (LPS) requirement (for example, output must be less than 60V/8A/100 W), if the output power exceeds a maximum power value permitted by the limited power source (LPS) requirement, the protection function must be instantly started with a view to effectively stopping undesirable phenomenon, such as overvoltage or overcurrent. However, when the rated output power of the electrical power conversion devices approximates to a boundary condition (for example, rated full-load output approximates to 100 W) of limited power source (LPS), a related voltage value required to trigger a protection function has to be precise in order to preclude a phenomenon: the protection function cannot be enabled when the output power exceeds the maximum power value permitted by the limited power source (LPS) requirement.

However, generation of precise voltage always leads to power loss, thereby adding to the difficulty in fulfilling the requirement of low stand-by power consumption of the electrical power conversion devices.

SUMMARY OF THE INVENTION

It is an objective of the present disclosure to provide an electrical power conversion device which incurs low power consumption.

Another objective of the present disclosure is to enhance the stability of a function triggering circuit for use with the electrical power conversion device.

Yet another objective of the present disclosure is to enable the function triggering action of the electrical power conversion device correctly in real time according to precise voltage detection.

In order to achieve the above and other objectives, the present disclosure provides a function triggering circuit for an electrical power conversion device. The electrical power conversion device comprises a transformer and a control module coupled to a primary side of the transformer, and the function triggering circuit is coupled between a secondary side of the transformer and the control module. The function triggering circuit comprises a current detection circuit, a delay circuit and a switching circuit. The current detection circuit generates a detection signal according to a result of comparing a current sampling level signal of the secondary side of the transformer with a reference level signal. The delay circuit is coupled to the current detection circuit. The delay circuit comprises a delayer, an isolating capacitor and a first comparator. The delayer delays a time sequence of inputting the detection signal to a negative end of the first comparator. The isolating capacitor is coupled between the secondary side of the transformer and the negative end of the first comparator. An internal level at a positive end of the first comparator is constant. Prior to steady-state duty of the transformer, the isolating capacitor causes the negative end of the first comparator to generate an initial level higher than the internal level. The switching circuit is coupled to the control module and adapted to generate a function triggering signal when a first comparison signal outputted by the output end of the first comparator is high level. The function triggering signal triggers the control module to carry out an overcurrent protection operation.

According to an embodiment of the present disclosure, the switching circuit comprises a delay module coupled between the negative end of the first comparator and a ground and adapted to cause the negative end of the first comparator to ground in response to the high-level first comparison signal.

According to an embodiment of the present disclosure, the delay module has a field-effect transistor with a gate end coupled to the output end of the first comparator, a drain end coupled to the negative end of the first comparator, and a source end coupled to the ground. The field-effect transistor is ON when the first comparison signal is high level.

According to an embodiment of the present disclosure, the switching circuit comprises an isolating signaling module and a clamping module. The isolating signaling module is coupled to the control module. The clamping module is coupled between the output end of the first comparator and the isolating signaling module. The clamping module is ON when the level of the first comparison signal is higher than a clamping level.

According to an embodiment of the present disclosure, the clamping level is higher than the internal level of the first comparator.

According to an embodiment of the present disclosure, the switching circuit comprises a delay module, a clamping module and an isolating signaling module. The isolating signaling module is coupled to the control module. The clamping module is coupled between the output end of the first comparator and the isolating signaling module. The delay module is coupled between the negative end of the first comparator and a ground. A control end of the delay module is coupled between the output end of the first comparator and the clamping module, such that the delay module causes the negative end of the first comparator to ground in response to the high-level first comparison signal. The clamping module is ON when level of the first comparison signal is higher than a clamping level of the clamping module.

According to an embodiment of the present disclosure, the delay module has a field-effect transistor with a gate end functioning as the control end of the delay module and being coupled to the output end of the first comparator, a drain end coupled to the negative end of the first comparator, and a source end coupled to the ground. The field-effect transistor is ON when the first comparison signal is high level.

In order to achieve the above and other objectives, the present disclosure further provides an electrical power conversion device, comprising: a transformer, a control module and a function triggering circuit. The transformer comprises the primary side and the secondary side. The control module is coupled to the primary side of the transformer. The function triggering circuit is coupled between the secondary side of the transformer and the control module. The function triggering circuit senses the secondary side of the transformer to generate a detection signal of delay. Before steady-state duty of the transformer, an initial level is higher than an internal level. After the steady-state duty of the transformer, a function triggering signal for triggering the control module to carry out an overcurrent protection operation is selectively generated according to the detection signal.

According to an embodiment of the present disclosure, the function triggering circuit comprises a delayer, a capacitor and a first comparator. The capacitor is coupled between the secondary side of the transformer and the negative end of the first comparator. Before the steady-state duty of the transformer, the capacitor causes the negative end of the first comparator to generate the initial level.

According to an embodiment of the present disclosure, the detection signal is inputted to the negative end of the first comparator, and the positive end of the first comparator has the internal level.

According to an embodiment of the present disclosure, the delayer causes the detection signal to be delayed during a peak load time period required to connect to a load of the electrical power conversion device.

According to an embodiment of the present disclosure, the function triggering circuit comprises a second comparator coupled between the secondary side of the transformer and the delayer and adapted to generate the detection signal, wherein the second comparator has a positive end for receiving a reference level signal subjected to voltage division and a negative end for receiving a current sampling level signal of the secondary side of the transformer.

In order to achieve the above and other objectives, the present disclosure further provides a function triggering method for an electrical power conversion device, comprising: sensing a secondary side of a transformer of the electrical power conversion device to generate a detection signal; delaying the detection signal; generating an initial level at a negative end of a first comparator before the electrical power conversion device enters a start cycle of steady-state duty, the initial level being higher than an internal level at a positive end of the first comparator; and selectively generating a function triggering signal for triggering the electrical power conversion device to carry out a protection operation according to the detection signal during the electrical power conversion device enters a duty cycle of steady-state duty.

According to an embodiment of the present disclosure, the internal level at the positive end of the first comparator is constant, and the initial level is higher than the internal level.

According to an embodiment of the present disclosure, a delay time period of the detection signal is a peak load time period required to connect to a load of the electrical power conversion device.

According to an embodiment of the present disclosure, a delay occurs between an output end and the negative end of the first comparator during the start cycle or the duty cycle.

According to an embodiment of the present disclosure, during the start cycle or the duty cycle, the level of the first comparison signal is transmitted only when it greater than or equal to a clamping level, so as to generate the function triggering signal correspondingly.

According to an embodiment of the present disclosure, the clamping level is higher than the internal level of the first comparator.

Thus, the function triggering circuit triggers current detection according to the secondary side of the transformer. The high-precision internal level and the first comparator with low loss, coupled with the isolating capacitor, not only augment the accuracy of the first comparison signal but also enhance the stability of function triggering.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, apparatuses, modules, devices, circuits and signals, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, components, apparatuses, modules, devices, circuits, signals, or other component usually inherent in the module.

Ordinal numbers, such as "first" and "second," used herein are intended to distinguish or correlate identical or similar units, components, apparatuses, modules, devices, circuits and/or signals and do not necessarily imply what order the units, components, apparatuses, modules, devices, circuits and/or signals are in in terms of space or time. It is understood that in some situations or arrangements the ordinal numbers may be swapped without affecting the effects of implementation of the present disclosure.

Figure 1:
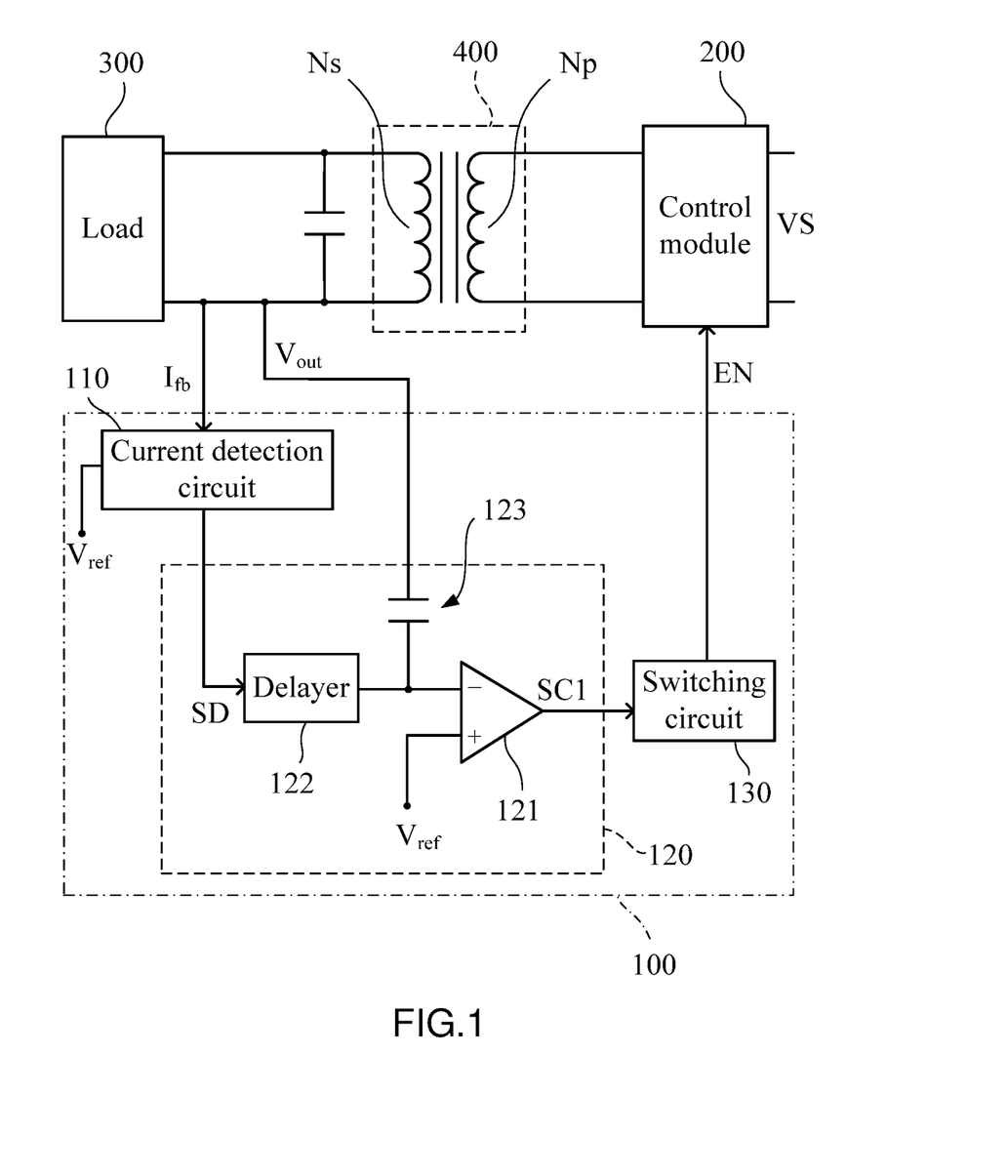
FIG. 1 is a circuit diagram of an electrical power conversion device according to an embodiment of the present disclosure.

Referring to FIG. 1, there is shown a circuit diagram of an electrical power conversion device according to an embodiment of the present disclosure. The electrical power conversion device comprises a function triggering circuit 100, a control module 200 and a transformer 400.

The control module 200 is coupled to the primary side Np of the transformer 400. The load 300 is coupled to the secondary side Ns of the transformer 400. Under the control of the control module 200, the transformer 400 converts the input electrical power VS into the power that with electrical power specifications required by the load 300 and provides it to the load 300. The function triggering circuit 100 is disposed between the secondary side Ns of the transformer 400 and the control module 200.

The function triggering circuit 100 is coupled to the secondary side Ns and the control module 200. The function triggering circuit 100 feeds back a detection result to the control module 200 according to the power supply condition of the secondary side Ns, thereby allowing the control module 200 to perform related functions. In an embodiment of the present disclosure, the function triggering circuit 100 not only senses the secondary side Ns of the transformer 400 to generate a detection signal SD but also selectively generates a function triggering signal EN according to the detection signal SD, thereby allowing the control module 200 to carry out an overcurrent protection operation.

The control module 200 is intrinsically capable of carrying out overcurrent detection and protection on the primary side Np of the transformer 400. However, owing to the precision of its judgment, the overcurrent detection and protection is inadequate when it comes to an electrical power conversion device with a limited power source. In particular, the reliability of the overcurrent detection and protection on the primary side Np decreases as the rated output power approximates to the boundary condition of the limited power source. In an embodiment of the present disclosure, the reliability of the overcurrent detection and protection on the primary side Np is improved by the function triggering circuit 100.

The function triggering circuit 100 comprises a current detection circuit 110, a delay circuit 120 and a switching circuit 130. The delay circuit 120 is coupled between the current detection circuit 110 and the switching circuit 130.

Figure 2:
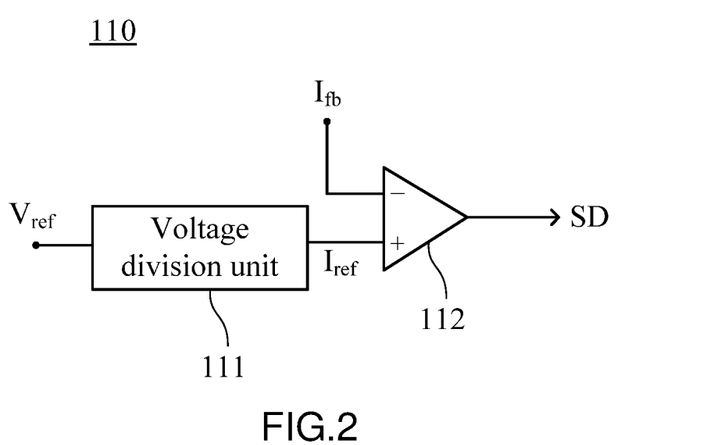
FIG. 2 is a circuit diagram of a current detection circuit according to an embodiment of the present disclosure.

The current detection circuit 110 generates the detection signal SD according to a comparison result of comparing a reference level signal $I_{ref}$ with a current sampling level signal $I_{fb}$ on the secondary side Ns of the transformer 400 (see FIG. 2). The delay circuit 120 delays the detection signal SD and generates a first comparison signal SC1 according to an internal level $V_{ref}$. The switching circuit 130 generates an output correspondingly according to the level of the first comparison signal SC1 and generates the function triggering signal EN when the first comparison signal SC1 is at a high level.

The first comparison signal SC1 functions as an output of the delay circuit 120. Subsequently, the level of the first comparison signal SC1 serves as the criterion for determining whether to generate the function triggering signal EN. Thus, the precise generation of the first comparison signal SC1 is important to the design of the delay circuit 120.

The delay circuit 120 comprises a first comparator 121, a delayer 122 and an isolating capacitor 123. The positive end of the first comparator 121 has the internal level $V_{ref}$ which is constant. For instance, an integrated circuit controller (IC controller) comprising operational amplifiers provides the delay circuit 120 with accurate standard signals for comparison with its constant internal level, such as 2.5 V. Moreover, the reference level signal $I_{ref}$ is obtained by dividing the internal level $V_{ref}$; hence, if precise internal level $V_{ref}$ is available, equally precise reference level signal $I_{ref}$ will be obtained. In an embodiment of the present disclosure, signals received by the negative end of the first comparator 121 are compared with the internal level $V_{ref}$.

Owing to the function triggering circuit 100, the overcurrent protection become sensitive. The delayer 122 delays the time at which the detection signal SD is inputted to the negative end of the first comparator 121; large fluctuations of the detection signal SD within a short period of time are eliminated because of a temporal delay between the input and output. For instance, it is not desirable for an overcurrent protection function to be triggered when instantaneous power consumption occurs to an electrical power conversion device in initial operation or instantaneous power consumption occurs to the load 300 performing a specific function. The delayer 122 deals with the instantaneous great power consumption; thus, after being processed, the input detection signal SD does not have the fluctuations, thereby allowing the negative end of the first comparator 121 to receive the processed detection signal SD. The delayer 122, for example, uses an RC circuit to perform a "slow charging, quick discharging" delay function, and uses its intrinsic resistor and capacitor to define the length of the delay time period.

For instance, the delay magnitude defined by the delayer 122 allows the detection signal SD to be delayed within a peak load time period. The peak load time period is the peak load time required by the load 300. The peak load time period is, for example, the time period which the electrical power conversion device takes to generate instantaneous high voltage or current on the secondary side Ns while the load 300 is performing a specific function. During the peak load time period, the function triggering circuit 100 does not generate the function triggering signal EN and thus does not trigger wrongly.

The function triggering circuit 100 ensures accurate voltage comparison results under the internal level $V_{ref}$. However, the internal level $V_{ref}$ is the internal voltage of the integrated circuit controller. At the initial stage of circuit start, the generation time period of the internal level $V_{ref}$ is shorter than the generation time period of the level (the detection signal SD, especially the detection signal SD delayed) outside the integrated circuit controller. In the absence of any abnormality (such as overvoltage or overcurrent) or during the steady state, the voltage level of the detection signal SD is higher than the internal level $V_{ref}$, such that the level received at the negative end of the first comparator 121 is higher than the internal level $V_{ref}$ received at the positive end of the first comparator 121, whereas the first comparison signal SC1 outputted by the first comparator 121 is low level and thus does not cause the switching circuit 130 to generate the function triggering signal EN.

The internal level $V_{ref}$ builds up quickly. When the internal level $V_{ref}$ has built up but the detection signal SD has not (as with the initial stage of circuit start), the first comparator 121 outputs the high-level first comparison signal SC1 (because the level received at its positive end is higher than the level received at its negative end) and thus causes the function triggering signal EN to trigger wrongly. Thus, the function triggering circuit 120 disclosed in an embodiment of the present disclosure further quickly builds up voltage level with the isolating capacitor 123, such that the negative end of the first comparator 121 has a level higher than the internal level $V_{ref}$ at the initial stage of circuit start.

The isolating capacitor 123 is a general capacitor component. When the electrical power conversion device starts (i.e., before steady-state duty), an output voltage $V_{out}$ increases from zero (i.e., changes significantly). Thus, the impedance of the isolating capacitor 123 is not infinite. Therefore, the impedance of the isolating capacitor 123 and the internal resistance at the negative end of the first comparator 121 together brings about voltage division, and thus a level is rapidly built up at the negative end of the first comparator 121, thereby preventing the level at the positive end of the first comparator 121 from being higher than the negative end level when the electrical power conversion device starts (i.e., before steady-state duty). If the level at the positive end of the first comparator 121 is higher than the negative end level, the first comparator 121 will output the high-level first comparison signal SC1, thereby causing the function triggering signal EN to trigger wrongly. After the steady-state duty, the isolating capacitor 123 receives the output voltage $V_{out}$ which manifests no frequency changes, and the output voltage $V_{out}$ is across the isolating capacitor 123. The impedance of the isolating capacitor 123 to the invariable output voltage $V_{out}$ is infinitely great and thus does not affect the negative end level of the first comparator 121. In other words, owing to its impedance, the isolating capacitor 123 allows a level to be rapidly built up at the negative end of the first comparator 121 in the course of the electrical power conversion device start, thereby preventing mistakes. After the steady-state duty, the output voltage $V_{out}$ is across the isolating capacitor 123 and thus does not affect the level at the negative end of the first comparator 121, thereby not affecting detection behavior in the steady state.

Referring to FIG. 2, there is shown a circuit diagram of a current detection circuit according to an embodiment of the present disclosure. The current detection circuit 110 comprises a voltage division unit 111 and a second comparator 112. The negative end of the second comparator 112 receives the current sampling level signal $I_{fb}$ captured from the secondary side Ns (shown in FIG. 1) of the transformer 400. The positive end of the second comparator 112 receives the reference level signal $I_{ref}$ formed as a result of voltage division which the voltage division unit 111 performs on the internal level $V_{ref}$.

According to the aforesaid arrangement, under normal load condition, the level received at the positive end of the second comparator 112 is set to be higher than the level received at the negative end of the second comparator 112. The detection signal SD, which functions as an output, has a high level because of the second comparator 112. The level of the detection signal SD is higher than the internal level $V_{ref}$; thus, the output of the first comparator 121 is low level, and the function triggering signal EN is not generated. The low-level reference level signal $I_{ref}$ is generated through precise voltage division of the internal level $V_{ref}$. In an abnormal situation (for example, overcurrent) which necessitates the generation of the function triggering signal EN, the current sampling level signal $I_{fb}$ has a high level which is higher than the reference level signal $I_{ref}$. As a result, not only is the output of the second comparator 112 low level and provided to the negative end of the first comparator 121, but the output of the first comparator 121 is also high level, thereby allowing the function triggering signal EN to be generated.

Figure 3:
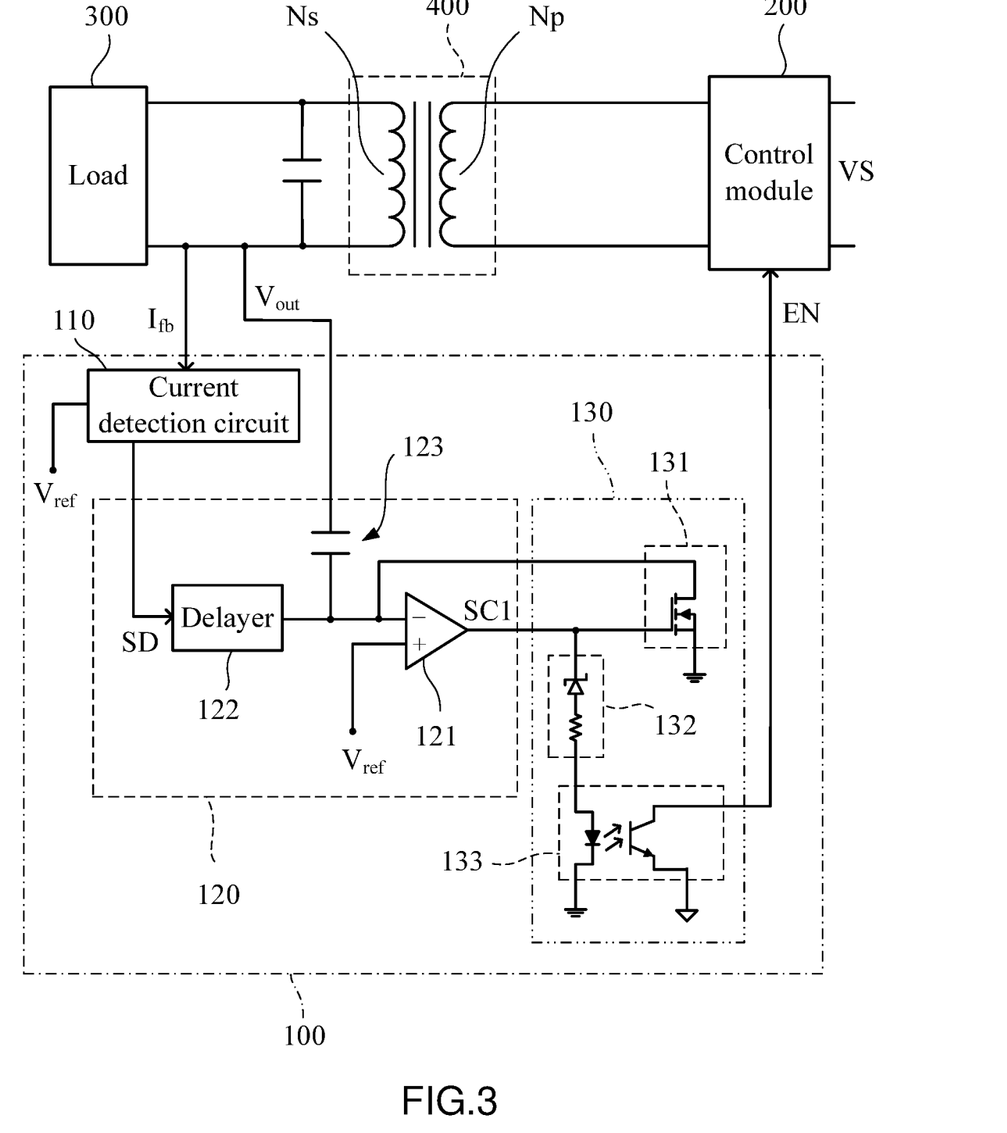
FIG. 3 is a circuit diagram of the electrical power conversion device according to another embodiment of the present disclosure.

Referring to FIG. 3, there is shown a circuit diagram of the electrical power conversion device according to another embodiment of the present disclosure. As shown in FIG. 3, the switching circuit 130 comprises a delay module 131, a clamping module 132 and an isolating signaling module 133. In a variant embodiment, one or both of the delay module 131 and the clamping module 132 are dispensable.

The isolating signaling module 133 is coupled to the control module 200. The isolating signaling module 133 switches according to the level of the output end of the first comparator 121. The isolating signaling module 133, for example, uses an optical coupler as a switching device. The optical coupler has one end controlled according to the output level of the first comparator 121 and the other end functioning as a switch for switching on or off a grounding path.

For instance, when the level outputted by the output end of the first comparator 121 is high level (indicative of presence of abnormality), the optical coupler is ON, thereby switching on the grounding path. Conversely, when the level outputted by the output end of the first comparator 121 is low level (indicative of absence of abnormality), the optical coupler is shut down, thereby rendering the grounding path turned off. The on/off status of the grounding path (regarded as generating a function triggering signal EN) has an effect on the internal circuit of the control module 200 (regarded as receiving the function triggering signal EN), such that the control module 200 carries out an overcurrent protection operation (for example, interrupts the supply of electrical power) to effectuate protection.

The clamping module 132 is coupled between the output end of the first comparator 121 and the isolating signaling module 133. When the level of the first comparison signal SC1 is higher than a clamping level of the clamping module 132, the clamping module 132 is ON. The clamping level is further set to be higher than the internal level $V_{ref}$ of the first comparator 121, for example, setting the clamping level to 4.3 V. However, the setting of the clamping level is not necessarily directly related to the internal level $V_{ref}$. Therefore, the threshold for triggering the function triggering signal EN is created by setting the clamping level. Furthermore, the rated high level of the first comparison signal SC1 is actually greater than the clamping level; thus, if an actual abnormality happens, the function triggering signal EN will be normally sent but will not be intercepted by the clamping module 132.

The clamping module 132 comprises, for example, a Zener diode and a resistance unit which are connected in series. Thus, when the cross voltage of the clamping module 132 across the isolating capacitor 123 is built up too quickly or when the isolating capacitor 123 malfunctions, it provides second-tier protection, prevents the function triggering signal EN from triggering wrongly, and further ensures that the level of the first comparison signal SC1 will be accurately determined. Specifically speaking, if the voltage across the isolating capacitor 123 is built up too quickly, the negative end of the first comparator 121 will not have the cross voltage derived from the output voltage $V_{out}$ when the voltage of the isolating capacitor 123 is already equal to the output voltage $V_{out}$, and thus the negative end level of the first comparator 121 cannot be quickly increased to its maximum during a transient state of the circuit start. Moreover, when the isolating capacitor 123 malfunctions, the level of the first comparison signal SC1 at the output end of the first comparator 121 begins to elevate, but its elevation is stopped by the clamping module 132 before it reaches the rated high level, thereby preventing the isolating signaling module 133 from being triggered to make any mistakes.

The delay module 131 is coupled between the negative end of the first comparator 121 and the ground. The delay module 131 causes the negative end of the first comparator 121 to connect to the ground in response to the high-level first comparison signal SC1. For instance, the delay module 131 has a field-effect transistor with a gate end coupled to the output end of the first comparator 121, a drain end coupled to the negative end of the first comparator 121, and a source end coupled to the ground. Thus, when the first comparison signal SC1 is high level, the field-effect transistor is ON, thereby causing the negative end of the first comparator 121 to connect to the ground. Therefore, when the first comparison signal SC1 is high level, it indicates an abnormal situation (for example, overcurrent), and thus related functional operations (for example, overcurrent protection operation) must be started as soon as possible. Owing to the delay module 131, the electric potential of the negative end of the first comparator 121 is quickly reduced and held, such that the high-level first comparison signal SC1 can be steadily outputted without fluctuations.

Thus, the function triggering method for an electrical power conversion device comprises the steps of: (1) sensing a secondary side of a transformer of the electrical power conversion device to generate a detection signal; (2) delaying the detection signal; (3) generating an initial level at the negative end of a first comparator before the electrical power conversion device enters a start cycle of steady-state duty, wherein the initial level is higher than an internal level of the positive end of the first comparator; and (4) selectively generating a function triggering signal for triggering the electrical power conversion device to carry out a protection operation according to the detection signal during the electrical power conversion device enters a duty cycle of steady-state duty.

Owing to the delay module 131, a delay occurs between an output end and the negative end of the first comparator 121 during the start cycle or the duty cycle of the electrical power conversion device. Moreover, during the start cycle or duty cycle of the electrical power conversion device, the level of the first comparison signal SC1 is transmitted only when it greater than or equal to the clamping level of the clamping module 132, so as to generate the function triggering signal EN, thereby preventing erroneous triggering.

Figure 4:
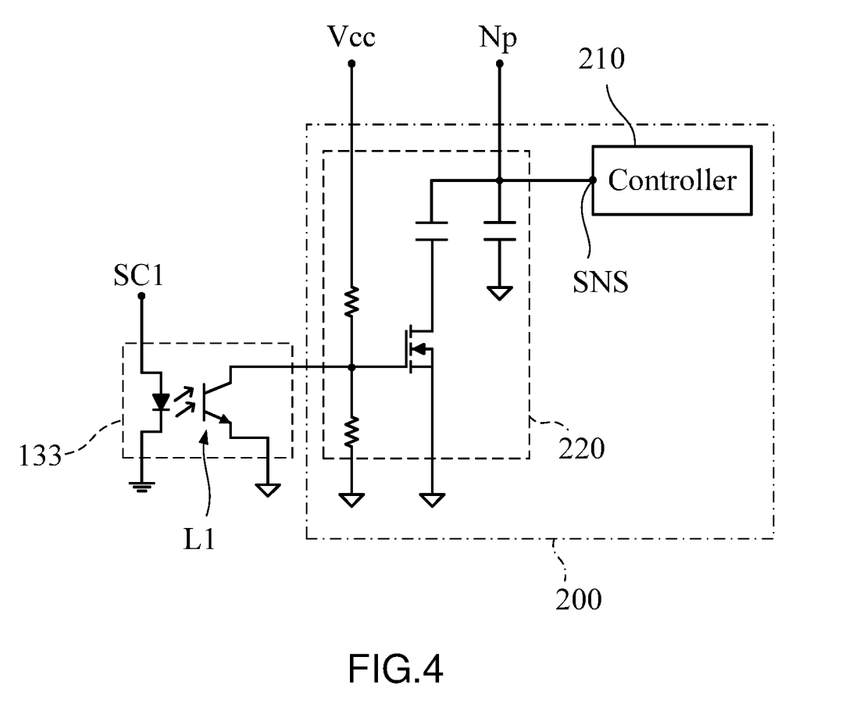
FIG. 4 is part of a circuit diagram between a switching circuit and a control module according to an embodiment of the present disclosure.

Referring to FIG. 4, there is shown part of a circuit diagram between a switching circuit and a control module according to an embodiment of the present disclosure. The control module 200 comprises a controller 210 and a detector 220. The controller 210 is, for example, the TEA2016 controller produced by NXP Semiconductors. The controller 210 has a pin SNS for detecting the current status of the primary side Np of the transformer. The pin SNS is coupled to a plurality of parallel-connected capacitors or resistors. A detect voltage is generated in accordance with the current derived from the primary side Np, thereby allowing the controller 210 to detect for occurrence of an overcurrent condition.

The detection of overcurrent on the primary side Np by the detector 220 is not precise and thus cannot satisfy the electrical power conversion device under limited power source (LPS) condition. Therefore, in the embodiment illustrated by FIG. 4, the detection for overcurrent and the start of overcurrent protection can be improved by exercising special control over the detector 220 of the control module 200. The function triggering circuit 100 achieves low power consumption (for example, meets the requirement of stand-by power consumption of less than 0.15 W), detects overcurrent condition accurately, and generates the function triggering signal EN quickly; hence, the detector 220 yields corresponding detection results, allowing the controller 210 to carry out an overcurrent protection operation precisely.

A capacitance path in the detector 220 is controlled by a switch component according to an internal circuit voltage Vcc; hence, the status of the control exercised with the switch component according to the internal circuit voltage Vcc is altered, thereby adjusting the arrangement of parallel-connected capacitors in the detector 220. Referring to FIG. 4, when the isolating signaling module 133 is ON (indicative of overcurrent), grounding path L1 is ON, such that the gate (or control signal) of the switch component is grounded, and the switch component is turned off, thereby altering the arrangement status of parallel-connected capacitors in the detector 220. Thus, the adjustment, for example, causes the two parallel-connected capacitors in FIG. 4 to be replaced by one capacitor. The test voltage value generated by one capacitor on the pin SNS is different from the detect voltage value generated by two capacitors on the pin SNS; hence, the controller 210 detects overcurrent and thus carries out an overcurrent protection operation.

In conclusion, the function triggering circuit disclosed in an embodiment of the present disclosure is conducive to enhancement of the precision and stability of the triggering mechanism of functional actions carried out by the electrical power conversion device, such that the electrical power conversion device meets the requirement of electrical power specifications of limited power source (LPS) under safety standard IEC 60950, provides precise overcurrent protection and achieves low stand-by power consumption.

While the invention has been described by way of example and in terms of the preferred embodiments, one person skilled in the art can understand that the embodiments are for explaining the present invention, but are not to be construed as limitations to the present invention. It is to be noted that, equivalent modifications and arrangements made based on the embodiments are covered within and the scope of the present invention. Therefore, the scope of the present invention should be accorded by the broadest interpretation of the appended claims of the application.

What is claimed is:

1. A function triggering circuit for an electrical power conversion device, the electrical power conversion device comprising a transformer and a control module coupled to a primary side of the transformer, the function triggering circuit being coupled between a secondary side of the transformer and the control module, the function triggering circuit comprising:

a current detection circuit for generating a detection signal according to a result of comparing a current sampling level signal of the secondary side of the transformer with a reference level signal;

a delay circuit coupled to the current detection circuit and comprising a delayer, an isolating capacitor and a first comparator, the delayer delaying a time sequence of inputting the detection signal to a negative end of the first comparator, the isolating capacitor being coupled between the secondary side of the transformer and the negative end of the first comparator, wherein an internal level at a positive end of the first comparator is constant, wherein, prior to steady-state duty of the transformer, the isolating capacitor causes the negative end of the first comparator to generate an initial level higher than the internal level; and a switching circuit coupled to the control module and adapted to generate a function triggering signal when a first comparison signal outputted at the output end of the first comparator is high level, wherein the function triggering signal triggers the control module to carry out an overcurrent protection operation.

2. The function triggering circuit of claim 1, wherein the switching circuit comprises a delay module coupled between the negative end of the first comparator and a ground and adapted to cause the negative end of the first comparator to ground in response to the high-level first comparison signal.

3. The function triggering circuit of claim 2, wherein the delay module has a field-effect transistor with a gate end coupled to the output end of the first comparator, a drain end coupled to the negative end of the first comparator, and a source end coupled to the ground, wherein the field-effect transistor is ON when the first comparison signal is high level.

4. The function triggering circuit of claim 1, wherein the switching circuit comprises an isolating signaling module and a clamping module, the isolating signaling module being coupled to the control module, the clamping module being coupled between the output end of the first comparator and the isolating signaling module, wherein the clamping module is ON when the level of the first comparison signal is higher than a clamping level.

5. The function triggering circuit of claim 4, wherein the clamping level is higher than the internal level of the first comparator.

6. The function triggering circuit of claim 1, wherein the switching circuit comprises a delay module, a clamping module and an isolating signaling module, the isolating signaling module being coupled to the control module, the clamping module being coupled between the output end of the first comparator and the isolating signaling module, the delay module being coupled between the negative end of the first comparator and a ground, wherein a control end of the delay module is coupled between the output end of the first comparator and the clamping module, such that the delay module causes the negative end of the first comparator to ground in response to the high-level first comparison signal, wherein the clamping module is ON when level of the first comparison signal is higher than a clamping level of the clamping module.

7. The function triggering circuit of claim 6, wherein the delay module has a field- effect transistor with a gate end functioning as the control end of the delay module and being coupled to the output end of the first comparator, a drain end coupled to the negative end of the first comparator, and a source end coupled to the ground, wherein the field-effect transistor is ON when the first comparison signal is high level.

8. The function triggering circuit of claim 6, wherein the clamping level is higher than the internal level of the first comparator.

9. An electrical power conversion device, comprising:
a transformer having a primary side and a secondary side;
a control module coupled to the primary side of the transformer; and
a function triggering circuit coupled between the secondary side of the transformer and the control module and adapted to sense the secondary side of the transformer so as to generate a detection signal of delay, wherein the function triggering circuit comprises a delayer, a capacitor and a first comparator, the capacitor being coupled between the secondary side of the transformer and a negative end of the first comparator, wherein an internal level at a positive end of the first comparator is constant, wherein the capacitor causes the negative end of the first comparator to generate an initial level higher than the internal level before steady-state duty of the transformer, and a function triggering signal for triggering the control module to carry out an overcurrent protection operation is selectively generated according to the detection signal after the steady-state duty of the transformer.

10. The electrical power conversion device of claim 9, wherein the detection signal is inputted to the negative end of the first comparator, and the positive end of the first comparator has the internal level.

11. The electrical power conversion device of claim 9, wherein the delayer causes the detection signal to be delayed during a peak load time period required to connect to a load of the electrical power conversion device.

12. The electrical power conversion device of claim 9, wherein the function triggering circuit comprises a second comparator coupled between the secondary side of the transformer and the delayer and adapted to generate the detection signal, wherein the second comparator has a positive end for receiving a reference level signal subjected to voltage division and a negative end for receiving a current sampling level signal of the secondary side of the transformer.

13. A function triggering method for an electrical power conversion device, comprising:
sensing a secondary side of a transformer of the electrical power conversion device to generate a detection signal;
delaying the detection signal;
generating an initial level at a negative end of a first comparator by a capacitor coupled between the secondary side of the transformer and the negative end of the first comparator during a start cycle before the electrical power conversion device enters steady-state duty, the initial level being higher than an internal level at a positive end of the first comparator; and
selectively generating a function triggering signal for triggering the electrical power conversion device to carry out a protection operation according to the detection signal during the electrical power conversion device enters a duty cycle of the steady-state duty.

14. The function triggering method of claim 13, wherein the internal level at the positive end of the first comparator is constant, and the initial level is higher than the internal level.

15. The function triggering method of claim 13, wherein a delay time period of the detection signal is a peak load time period required to connect to a load of the electrical power conversion device.

16. The function triggering method of claim 13, wherein a delay occurs between an output end of the first comparator and the negative end of the first comparator during the start cycle or the duty cycle.

17. The function triggering method of claim 13, wherein, during the start cycle or the duty cycle, a voltage level of a first comparison signal output from an output end of the first comparator is transmitted only when it greater than or equal to a clamping level, so as to generate the function triggering signal correspondingly.

18. The function triggering method of claim 17, wherein the clamping level is higher than the internal level of the first comparator.

* * * * *